United States Patent [19]

Hori et al.

[11] Patent Number: 4,755,888
[45] Date of Patent: Jul. 5, 1988

[54] HIGH SPEED CONTACT PRINTING SYSTEM

[75] Inventors: Takeshi Hori, Kanagawa; Tooru Naganuma; Yoshiharu Higano, both of Tokyo, all of Japan

[73] Assignee: Sony Corporation, Tokyo, Japan

[21] Appl. No.: 867,924

[22] Filed: May 29, 1986

[51] Int. Cl.$^4$ .................... G11B 5/06; G11B 15/18
[52] U.S. Cl. ................................. 360/16; 360/71
[58] Field of Search .............. 360/16, 17, 71, 72.2, 360/74.2; 242/180, 186

[56] References Cited

U.S. PATENT DOCUMENTS 4,531,166  7/1985  Anderson ..................... 360/74.2

Primary Examiner—Vincent P. Canney
Attorney, Agent, or Firm—Alvin Sinderbrand

[57] ABSTRACT

In a high speed contact printing system in which a measurement roller is installed to measure the running speed of either a master or slave magnetic tape, the remaining amount or length of the slave magnetic tape wound on a supply reel is automatically and accurately determined on the basis of information as to the thickness of the slave magnetic tape in addition to the rotational speeds of the measurement roller and of the supply reel for the slave magnetic tape. Consequently, the printing system always determines whether one of the programs recorded on the master magnetic tape can be printed on the remaining portion of the slave magnetic tape.

12 Claims, 3 Drawing Sheets

HIGH SPEED CONTACT PRINTING SYSTEM

BACKGROUND OF THE INVENTION

The present invention relates to a system for the high speed printing of a large number of magnetic tapes (so called recorded tapes) from a master magnetic tape on which signals are already recorded.

Devices for printing or copying signals by a tape-to-tape copying process from a master magnetic tape (hereinafter referred to as a master tape) on which the signals are already recorded in a mirror image form to a slave magnetic tape (hereinafter referred to as a slave tape) using either a magnetic printing or thermal printing method has been proposed, for example, in U.S. Pat. No. 3,592,977. In such devices, the slave tape usually has a length or recording time several times longer than the recording time of a program which is previously recorded on the master tape and which is to be copied onto the slave tape, so that the printing operations are repeated a number of times to generate a large number of volumes or successive recorded tapes on the slave tape and, thereafter, such successive volumes or recorded tape are severed from each other at the joints between the repeatedly copies program.

Since the tapes having different lengths are often sequentially used as the slave tape (or so-called pancake tape), the number of volumes or recorded tapes that can be produced from the slave tape for each replacement of the slave tape has to be previously calculated and set and thereafter the printing operation is carried out so that a maximum number of recorded tapes can be obtained from the slave tape.

However, since, as described above, the allowable number of the recorded tapes has to be calculated for each replacement of the slave tape and then the printing system is set according to the result of such calculation, before the printing operation can be carried out, the described procedure is very troublesome. Further if a calculation error occurs, a length of the slave tape longer than one recorded or copied tape is destroyed at a part near a tape end or the printing system commences a new printing operation when less than the required length of the slave tape remains so that operating time is wasted.

OBJECTS AND SUMMARY OF THE INVENTION

With the above-described drawbacks in mind, it is an object of the present invention to provide a system for printing signals from a master tape onto a slave tape, and in which the remaining length of slave tape is automatically determined and a printing operation proceeds only when such remaining length exceeds the length of the recorded program to be copied from the master tape.

It is a further object of the invention to provide a system, as aforesaid, in which a measurement roller is rotated in accordance with the tape running speed of either the master tape or slave tape for detecting the running speed of the tape, and the rotational speed of a supply reel carrying the slave tape and a thickness of the slave tape are detected so that the length of the remaining tape wound on the supply reel of the slave tape can be automatically and accurately determined on the basis of the detected tape thickness, the tape running speed and the rotational speed of the slave tape supply reel.

In accordance with one aspect of the present invention, a printing system comprises means for applying a magnetic field to a master magnetic tape and a slave magnetic tape having a length substantially longer than the master magnetic tape, both magnetic tapes being closely contacted with each other during the running of the tapes so as to print or copy signals recorded on the master magnetic tape onto the slave magnetic tape; means for detecting the rotational speed of a measurement roller which rotates according to a running speed of the slave or master magnetic tape; means for detecting the rotational speed of a supply reel for the slave magnetic tape; means for determining a thickness of the slave magnetic tape; and means for calculating the remaining amount of the tape wound on the supply reel for the slave magnetic tape on the basis of the detected tape thickness, the running speed of the tape and the rotational speed of the slave tape supply reel.

BRIEF DESCRIPTION OF THE DRAWINGS

A more complete understanding of the present invention may be obtained from the following detailed description taken in conjunction with the drawings in which.

DETAILED DESCRIPTION OF THE PREFERRED EMBODIMENTS

Reference will hereinafter be made to the drawings in order to facilitate understanding of the present invention.

Figure 1:
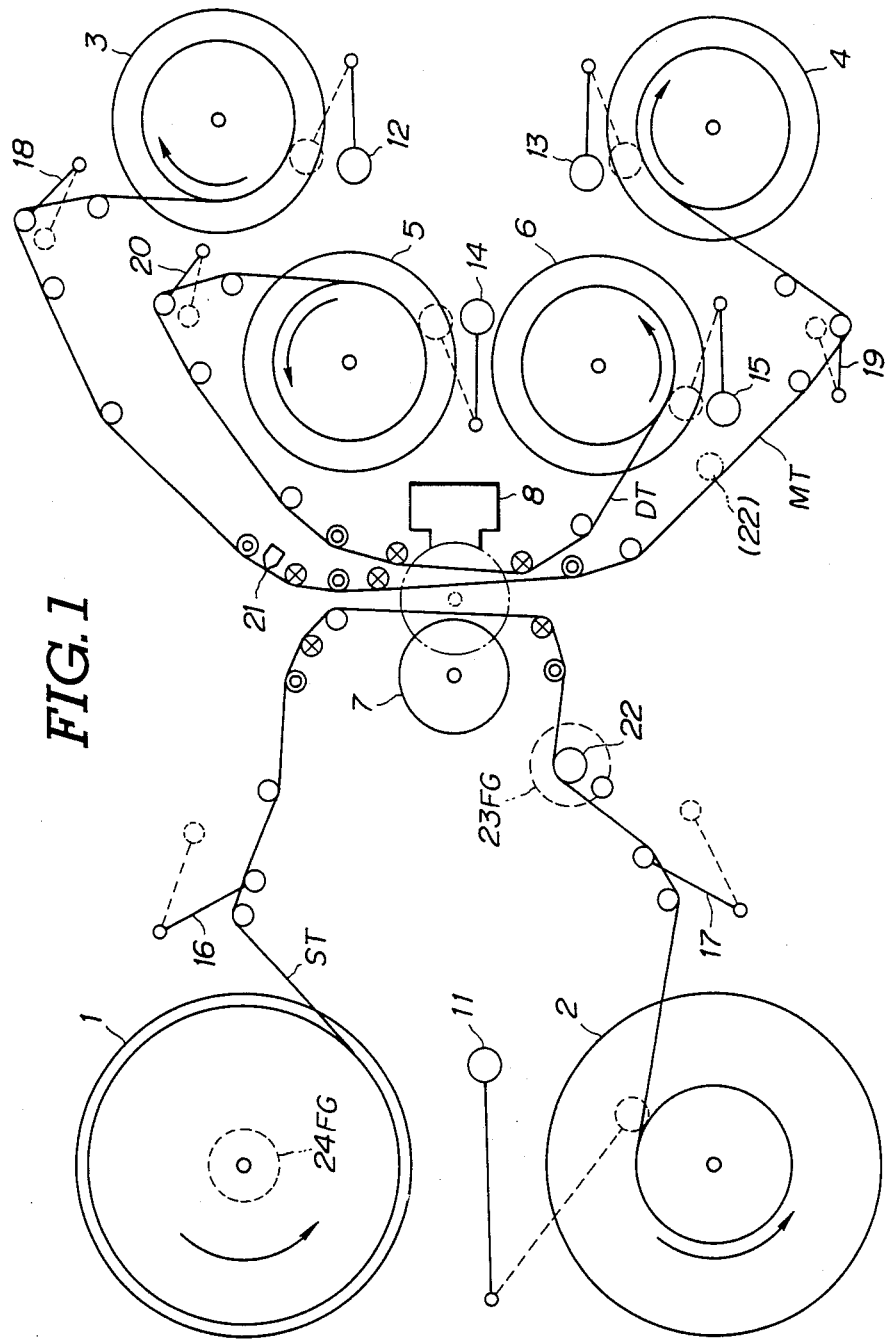
FIG. 1 is a diagrammatical front view of a printing system in accordance with a preferred embodiment of the present invention.

Referring initially to FIG. 1 which shows a preferred embodiment of the printing system according to the present invention, it will be seen that numerals 1 and 2 denote slave tape supply and take up reels, which have diameters of approximately 27 centimeters (cm), respectively. Numerals 3 and 4 denote master tape supply and take up reels, respectively, and numerals 5 and 6 denote drive tape supply and take up reels, respectively. These reels 3 through 6 each have a diameter of about 18 centimeters. In addition, a reel bed of each of reels 1 through 6 is directly engaged with a corresponding reel motor (not shown) (specifically an AC torque motor).

Furthermore, the reel bed for each of reels 1 through 6 is provided with a parking brake for preventing tape looseness when the corresponding tape is stopped. The reel bed of each of reels 3 through 6 associated with the master tape MT and drive tape DT is provided with a rotation detector (not shown) for detecting a rotation direction and speed of the corresponding reel for use in effecting servo control of the rotation speed of the reel motor. Each rotation detector has a high resolution by producing several tens of pulses per rotation of the corresponding reel.

It should be noted that the slave tape ST is a metal tape made of a magnetic material of Cobalt added $\gamma$ oxide iron (Hc$\approx$650 Oe) and the master tape MT is a metal tape made of a magnetic material of pure iron (Hc$\approx$2000 Oe) with a back coating. The drive tape DT is made of a base material with the back coating. Each of tapes ST, MT, and DT has a tape width of 12.65 milimeter. Each of tapes ST, MT, and DT is guided from its respective supply reel 1, 3, or 5 to the respective take up reel 2, 4, or 5, as shown in FIG. 1.

Numerals 7 and 8 denote a transfer drum and contact chamber, respectively. The drum 7 is made of metal and uses a hydrostatic bearing in order to achieve its smooth rotation and movement of the associated tape with high accuracy. In an operation mode other than a printing mode, the drum 7 is separated from chamber 8 as denoted by a solid line in FIG. 1 and the three tapes are mutually separated. In the printing mode, the drum 7 is pressed by means of a pneumatic cylinder (not shown) in the direction toward the chamber 8 so as to attain the position denoted by a dot-dash and dash-dash line in FIG. 1. The three tapes ST, MT, and DT are closely contacted with the drum 7 and with one another by means of compressed air under a pressure of 4 Kg/cm$^2$ blown out from the chamber 8. At this time, to avoid slippage of the drive tape DT, the back coating surface of the drive tape DT faces away from the master tape, and hence does not engage the back coating surface of the latter. Furthermore, a bias head (not shown) is disposed within the chamber 8 and a required printing magnetic field is applied to the bias head so that the three magnetic patterns of video, audio and control signals are simultaneously printed on the slow tape. Alternatively, and as is also well known, transfer or printing of the magnetic patterns from the master magnetic tape to the slave magnetic tape may be promoted by a source of heat (not shown) within chamber 8.

In addition, during the printing operation, the three mutually closely contacted tapes, that is, master, slave, and drive tapes MT, ST, and DT are integrally driven by means of the reel motor (not shown) of the take up reel 6 for the drive tape DT. At this time, the speed of the reel motor for the drive tape DT is servo controlled and the reel motor of the supply reel 5 and reel motors of reels 1 through 4 of the master tape MT and slave tape ST are tension servo controlled.

Numerals 11 through 15 denote tape press rollers which prevent the introduction of air between the tapes on the reels 2 through 6. The press rollers are installed on supply reels 3 and 5 as well as on take-up reels 4 and 6 due to the movements of tapes MT and DT in both directions between reels 3 and 4 and reels 5 and 6. Numerals 16 through 20 denote tension arms, which are located at positions denoted by dotted lines in FIG. 1 to detect tape tension and carry out tension servo control, as described later. It is noted that each tension arm 16 through 20 is locked at a respective position denoted by a solid line in FIG. 1 when the corresponding tape is mounted (or stopped) as described later. Numeral 21 denotes a Q or cue signal playback head, contacted with a rear surface of the master tape MT, for detecting each cue signal (for example, a sinusoidal wave signal having a frequency of 65 Hz and continuing for two seconds) signifying the the start and end of a program recorded on the master tape. The detected signal from head 21 is used to control the tape running system and to determine the type of recording system as described later ($\beta$ or VHS system).

Numeral 22 denotes a measurement roller engaged by slave tape ST and disposed, in this embodiment, at the take up side of the slave tape and used for detecting the tape running speed and the printed length from the rotation speed and the number of rotations of the roller 22.

As shown in FIG. 1, a great number of tape guides are disposed along the running path of each tape in the preferred embodiment. Among these tape guides, there are tape guides made of an alumina material having a high wear resistance characteristic and being disposed in the vicinity of the transfer drum 7 where the corresponding tape needs to be accurately guided so as to limit the position of a lower edge or upper edge of the tape (such tape guides are denoted by ⊗ or ⊙). In addition, a part of each such tape guide which is contacted with a surface of the tape is made of a titania material having a smooth surface and a good conductivity in order to conduct electrostatically generally electricity to ground. Along those parts of the running path of each tape at which the need for extreme accuracy is not so strict, a guide roller with a ball bearing is used.

Frequency or pulse generators 23 and 24 are attached to the measurement roller 22 and supply reel 1, respectively, to detect the rotational speeds Nk and Nc of the measurement roller 22 and supply reel 1, respectively. The frequency generators 23 and 24 have the same constructions as the rotation detectors attached to the respective reels 3 through 6. When the printing system described above carries out the printing operation, the speed of the three mutually contacted tapes is 3 m/s (a speed 150 times faster than the tape speed for the recording and reproducing modes in the $\beta$II mode) and the printing of, for example, a program having a running time of 120 minutes is carried out in about one minute and 30 seconds.

Since the widths of magnetic tapes used in the $\beta$ system and VHS system are the same, the printing system according to the present invention can print a magnetic tape with a signal recorded according to either the $\beta$ or VHS system in the same way.

Furthermore, since different thicknesses of the slave tape St may be used, means are provided for detecting the tape thickness used in the printing system. In this embodiment, the thickness determining means uses the magnetic head 21 to detect a start Q signal and end Q signal on the master tape MT at the time of a first printing operation and, from the number of pulses generated by frequency generator 23 between such detected Q signals, the length or duration $L_o$ of a program recorded on the master tape MT can be measured. Then a Central Processing Unit (CPU) of a microcomputer determines the tape thickness from the measured program length. For example, if the measured time is within 2 hours (provided that the tape is in the $\beta$ system), such tape is to have a first thickness characteristic of a tape cassette used in the $\beta$ system and which is generally referred to as an L500 tape cassette, or having a length shorter than the tape in the L500 cassette. In a case where a program recorded on the master tape MT is determined to have a duration or length from two hours to three hours between the Q or cue signals described above at the time of the first printing, the CPU determines that a tape having a second thickness (L750 tape) is to be used as the slave tape. In a case where the program length exceeds three hours, the CPU determines that a tape having a third thickness (L830 tape) is to be used as the slave tape ST.

When an operator of the printing system mounts a supply reel 1 carrying the slave tape ST on the printing system, he selects a slave tape having a thickness suitable for the previously determined format and length of program recorded on the master tape MT. For example, if the length of program is within two hours, the slave tape ST provided on supply reel 1 in the printing system will have a thickness characteristic of the tape in an L500 cassette. Therefore, as described above, the thickness of the slave tape ST to be used can automatically be determined on the basis of the length of the program recorded on the master tape, i.e., on the basis of the time interval between the start Q signal and end Q signal of the recorded program.

The following Table 1 shows the various thicknesses of the magnetic tape used in cassettes for a video tape recorder (VTR) of the $\beta$ system.

TABLE 1

| Time ($\beta$II) | Kind | Thickness ($\mu$) | |
|---|---|---|---|
| Up to 2 hours | L500 or less | 19.2 through 20.7 | First Thickness |
| 2 hours to 3 hours | L750 | 13.8 through 15.3 | Second Thickness |
| 3 hours or more | L850 | 12.3 through 13.5 | Third Thickness |

In addition, the following Table 2 shows the thicknesses of the magnetic tape used in cassettes for a VTR of the VHS system.

TABLE 2

| Time (Standard) | Kind | Thickness ($\mu$) | |
|---|---|---|---|
| Up to 2 hours | T120 | 18.0 through 21.0 | Fourth Thickness |
| 2 hours to 3 hours | T160 | 15.6 | Fifth Thickness |

As described above, the start Q signal and end Q signal are recorded on the master tape MT. The start Q signal recorded on the master tape according to the $\beta$ system is played back for 24 seconds when reproducing it in the $\beta$II mode, that is, at the tape speed of 20 mm/s. Similarly, the start Q signal recorded on the master tape according to the VHS system is played back for 24 seconds when reproducing it in the standard mode, that is at the tape speed of 32 mm/s. Hence, the recorded length of the start Q signal on the tape is different for the $\beta$ system or the VHS system. Consequently, since the reproduction times of the start Q signal are different when the tapes recorded according to the $\beta$ system and VHS system are run at the same speed at the time of the first printing, the CPU can automatically determine which of the systems was used for the master tape MT. If rising and falling edges of the start Q signal are detected by means of the playback head 21 and the number of pulses generated from the frequency generator 23 attached to measurement roller 22 are counted in the interval between the detected rising and falling edges of the start Q signal, the recording system used for making the master tape MT ($\beta$ system or VHS system) can be determined.

Figure 2:
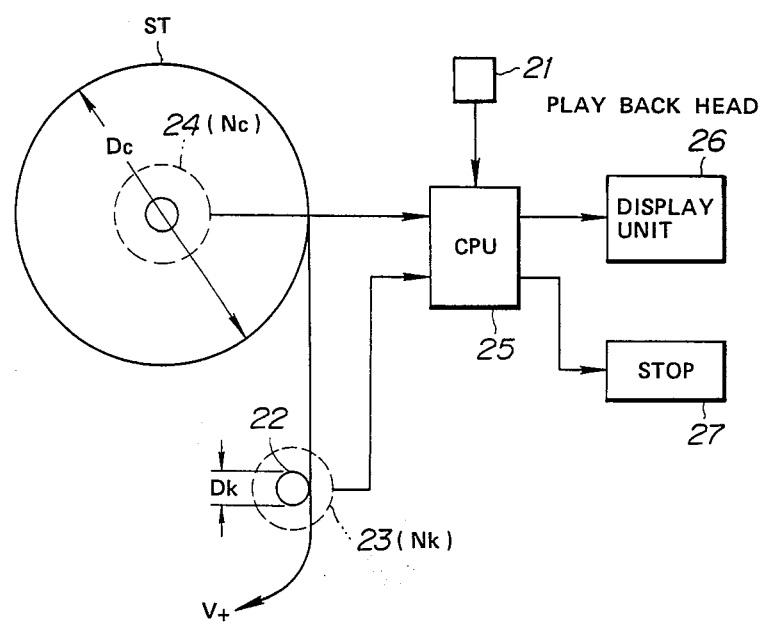
FIG. 2 is a simplified block diagram of a control circuit applicable to the present invention.

FIG. 2 shows an example of a control circuit applicable to the present invention.

In FIG. 2, a CPU 25 of a microcomputer receives the signals (pulse waveforms) from the above-described frequency generators 23 and 24, the Q signals from the playback head 21, and so on, and processes these signals to provide output signals to a display unit 26 and to a printing stop unit 27.

Figure 3:
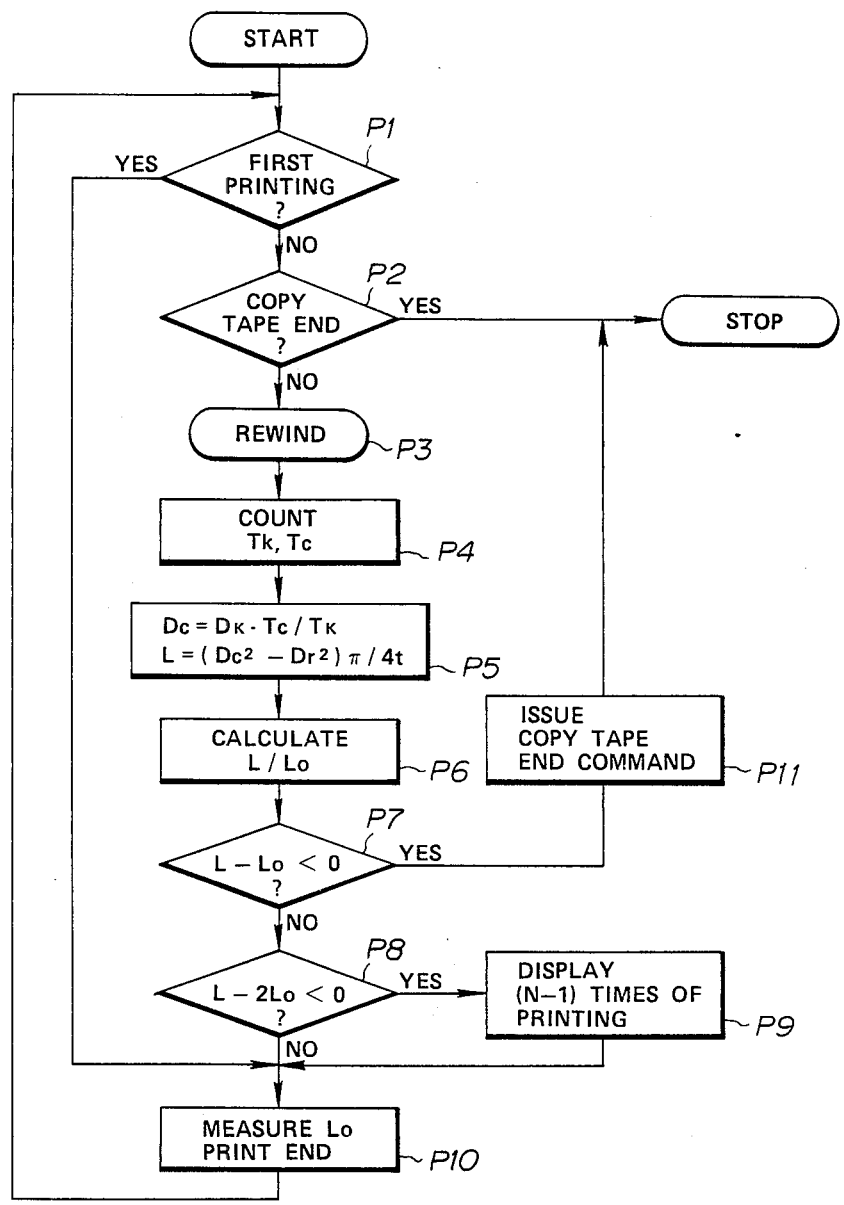
FIG. 3 is an operational flowchart of the control circuit shown in FIG. 2.

Next, the operation of the control circuit shown in FIG. 2 will be described with reference to a flowchart shown in FIG. 3.

After the operator installs in the printing system shown on FIG. 1 the master tape MT and the slave tape ST having the requisite thickness determined according to the length of a program recorded, the master tape MT on the printing operation, is started. When the printing system is at this time in the printing mode, the start Q signal is reproduced from the master tape MT by playback head 21 and a head part or initiation of the program recorded on the master tape MT is detected. At this time, if it is determined in step $P_1$ that the printing on the slave tape ST is being effected for the first time, the routine goes to a step P10 in which the CPU 25 detects the start Q signal, starts counting of the number of pulses derived from the frequency generator 23, and stops the counting in response to the end of printing indicated by the presence of the end Q signal. A length or duration Lo of time between the start Q signal and end Q signal, that is, the record time of the program on master tape MT, is determined from the counted number of pulses and is then stored in a register of the CPU 25. The system is removed from the printing mode in response to the detection of the end Q signal, i.e., the closely contacted state of the three tapes is released by movement of drum 7 away from contact chamber 8, the slave tape ST is stopped and the master and drive tapes MT, DT are rewound at a high speed in a step P3 via steps P1 and P2.

Upon completion of the rewinding operation, the printing system is again changed over to the print mode to enter the second printing operation in which the three tapes MT, ST, DT are transferred from their supply reels to their take-up reels with the three tapes being closely contacted with each other. After the servo control of the speed of the three tapes is started, the CPU 25 counts the number of pulses derived from the frequency generators 23 and 24, and derives therefrom the rotational periods $T_R$ and Tc of roller 22 and supply reel 1, respectively, in a step P4. Then, in a step P5, CPU 25 calculates the length L of the tape remaining on the supply reel for the slave tape. That calculation by the CPU 25 is carried out in the following way.

Suppose that

Dc . . . is the outer diameter of the remaining slave tape ST wound on supply reel 1, Dk . . . is the diameter of the measurement roller 22, Tc . . . is the rotation period of the supply reel 1 carrying slave tape ST, Tk . . . is the rotation period of the measurement roller 22, Nc . . . is the rotational speed of the supply reel 1 for the slave tape ST, Nk . . . is the rotational speed of the measurement roller 22, Vt . . . is the linear or transfer speed of the slave tape ST, and Dr . . . is the minimum diameter of the wound slave tape and corresponds to the hub diameter of the supply reel 1 for the slave tape.

The rotation speed Nc of the supply reel for the slave tape ST and rotational speed Nk of the measurement roller 22 can thus be expressed by (Nc=)1/Tc and (Nk=)1/Tk, respectively. In addition, since the tape speed Vt is expressed as follows:

$$Vt = \pi Dk.Nk = \pi Dk/Tk$$

$$Vt = \pi Dc.Nc = \pi Dc/Tc,$$

Dc can be expressed as $Dc = Dk \cdot Tc/Tk$. Since the diameter Dk of the measurement roller 22 is known, the CPU 25 can calculate the wound diameter Dc on the basis of the frequencies of the pulses derived from the frequency generators FG 23, 24.

In step P5, after the wound diameter Dc is calculated, the CPU 25 further calculates the remaining length L of the slave tape on the supply reel 1 in accordance with the equation $L = (D_c^2 - D_r^2)\pi/4t$. It should be noted that Symbol t used in the calculation of the length L denotes the thickness of the slave tape ST. As described above, the thickness t is determined to be the first thickness, second thickness, third thickness, or the like on the basis of the duration of the program (that is, the time interval from the start Q signal detection to the end Q signal detection) at the time of the first printing and is stored previously in the register of the CPU 25. Since the thickness of the tape, as maufactured, has dispersions or variations, the maximum value of the thickness, as established by the manufacturing tolerances therefor, is selected for use in the foregoing calculation so that a minimum remaining amount or length of the tape is estimated and an accurate limit of use can be expected.

In this way, after the CPU 25 calculates the remaining amount L of the tape, the routine goes to step P6 in which the CPU 25 calculates the ratio of L/Lo and sends to display unit 26 a signal indicating how many volumes of the program recorded on master tape MT can be printed on the remaining length of the slave tape ST.

In a step P7, the CPU 25 calculates a subtraction such as L−Lo and compares the result of this subtraction L−Lo with zero. If (L−Lo) is <0 is determined to be (YES) in step P7, the routine goes to step P11 in which the printing operation is stopped in response to a stop command from the CPU 25. If on the other hand, as is usual in the second printing operation, the comparison result in the step P7 is usually L−Lo<0 (NO), the routine goes to step P8.

In step P8, the CPU 25 determines whether the subtraction of 2LO from L is greater or less than zero. If (L−2LO)≧0 (in the second printing operation the comparison result is usually L−2Lo>0) is determined in the step P8, the routine goes to the step P10 in which the second printing is ended, that is, the master and drive tapes MT, DT are rewound and thereafter the routine returns to step P1 and the printing system enters the third printing operation.

In this way, as any number of printing operations are carried out and the remaining wound amount (length) L of the slave tape ST on reel 1 becomes less step P8 eventually results in the inequality L−2Lo<0. At this time, the routine goes to step P9 in which the CPU 25 determines that the current printing operation is the next to last printing (N−1) before the last printing (N times) and correspondingly informs the display unit 26 in which the above-described information is displayed.

Upon the completion of (N−1) printing operations, the printing system enters the Nth printing operation and carries out the printing of the slave tape ST for the last time. Upon the completion of the printing for the last time (N), the CPU 25 determines in the step P7 that L−Lo<0 is established in the last printing operation and stores the result in step P7 and the routine goes to step P11 in which the CPU 25 issues a printing end command (copy tape end) and the printing system stops. Consequently, printing of one reel of the slave tape ST has been completed.

In another preferred embodiment, with the length Lo of the recorded program on the master tape being measured at the time of the first printing operation in the same way as the above-described embodiment, the remaining amount of tape L may be measured at the time of the second printing operation, and then the ratio of L/Lo may be calculated to determine how many repetitions of the program recorded on the master tape MT can be printed on the remaining length L of the slave tape. Thus, the sequential printing operations may be carried out, and the printing system may be stopped when the predetermined number of the printing operations has been completed.

It is noted that, although in the embodiment shown in FIG. 1 the measurement roller 22 is installed for engagement with the slave tape ST, the roller 22 may be installed for engagement with the master tape MT, for example, as indicated in dot-dash lines at (22) on FIG. 1. As described hereinabove, in the printing system according to the present invention, the remaining amount of the slave tape ST on the supply reel therefor is calculated on the basis of information concerning the thickness of the slave tape as well as the rotational speed Nk of the measurement roller 22 and the rotational speed Nc of the supply reel 1 on which the slave tape ST is wound. Therefore, the calculated value is very accurate so that accurate detection of the last possible complete printing operation can be achieved.

It will be appreciated that, although preferred embodiments of the invention have been described in detail with reference to the drawings, the invention is not limited to those embodiments, and that various changes and modifications may be made therein by one skilled in the art without departing from the scope of the present invention which is to be defined by the appended claims.

What is claimed is:

1. A printing system for printing signals representing a program recorded on a master magnetic tape onto a slave magnetic tape having a length substantially longer than the master magnetic tape, comprising:
    a supply reel on which the slave magnetic tape is wound:
    printing means for applying a magnetic field to said master magnetic tape and said slave magnetic tape as both magnetic tapes are closely contacted with each other during the running of the tapes so as to print said signals recorded on the master magnetic tape on the slave magnetic tape being unwound from said supply reel;
    means for detecting the rotational speed of a measurement roller which rotates according to a running speed of the master magnetic tape;
    means for detecting the rotational speed of said supply reel for the slave magnetic tape;
    means for determining a thickness of the slave magnetic tape; and
    means for calculating the remaining amount of the slave magnetic tape wound on the supply reel on the basis of the detected rotational speeds of said measurement roller and of said supply reel, respectively, and the determined thickness of said slave magnetic tape.

2. The printing system according to claim 1, wherein said means for detecting the rotational speed of said measurement roller includes a frequency generator attached to the measurement roller and which produces a pulse train signal with a frequency indicating the rotational speed of the measurement roller.

3. The printing system according to claim 2; in which said master magnetic tape has a start cue signal and an end cue signal recorded thereon at the start and end, respectively, of said program, and said thickness of the slave magnetic tape is dependent, at least in part, on the duration of said program; and wherein said means for determining the thickness of the slave magnetic tape includes a play-back head for detecting the start and end cue signals and said duration of the program recorded on the master tape is indicated by the number of pulses produced by said frequency generator in the interval between the detection by said playback head of said start cue signal and said end cue signal recorded on the master tape at the time of a first printing operation by said printing means.

4. The printing system according to claim 3; wherein said means for determining the slave magnetic tape thickness is further operative for determining whether a $\beta$ system or a VHS system was employed for recording the master magnetic tape on the basis of the duration of the reproduction of said start cue signal recorded on the master magnetic tape when the master and slave magnetic tapes are run at the same speed during operation of said printing means, and said thickness of the slave magnetic type is further dependent on whether a $\beta$ system or a VHS system was used for recording the master magnetic tape.

5. The printing system according to claim 4, wherein whether the $\beta$ system or the VHS system was used for recording the master magnetic tape is determined on the basis of the detection of rising and falling edges of said start cue signal and the number of pulses produced by said frequency generator between said detection of the rising and falling edges of the start cue signal.

6. The printing system according to claim 1, wherein said means for calculating determines said remaining amount of the slave magnetic tape wound on the supply reel therefor on the basis of the following equation: $L=(Dc^2-Dr^2)\pi/4t$, wherein Dc denotes an outer diameter of the slave magnetic tape wound on the supply reel and is determined from $Dc=Dk\cdot Tc/Tk$, wherein Dk denotes the diameter of the measurement roller, $Tc(=1/Nc)$ denotes a rotation period of said supply reel for the slave magnetic tape ST, $Tk(=1/Nk)$ denotes a rotation period of the measurement roller, Dr denotes a minimum diameter of the slave magnetic tape wound on the supply reel of the slave magnetic tape, and t denotes the determined thickness of the slave magnetic tape.

7. The printing system according to claim 6, in which said master magnetic tape has a start cue signal and an end cue signal recorded thereon at the start and end, respectively, of said program, and said means for detecting the rotational speed of the measurement roller includes a frequency generator attached to said measurement roller and providing a train of pulses in response to rotation of the latter; and further comprising means for calculating and storing a time duration of said program recorded on the master tape as determined from the number of said pulses produced by said frequency generator according to the number of rotations of the measurement roller in the interval between detection by a playback head in the printing system of said start cue signal and said end cue signal at the time of a first operation by said printing means, and means for calculating a ratio of said remaining amount of the slave magnetic tape wound on the supply reel to said duration of said program and displaying how many volumes of the slave magnetic tape can be printed with said program.

8. The printing system according to claim 7, which further comprises means for calculating the difference between said remaining amount of the slave magnetic tape and two times said duration of the program and for comparing the calculated difference with zero whenever an operation by said printing means is carried out, and means displaying that a current printing operation is the next to the last printing operation possible on said remaining amount of slave magnetic tape when said comparing indicates that said calculated difference is less than zero.

9. The printing system according to claim 8, which further comprises means for calculating a second difference between said remaining amount of the slave magnetic tape and said duration of the program and for comparing said second difference with zero whenever an operation of said printing means is carried out, and means ending printing on the slave magnetic tape when, at the completion of the printing of a program on the slave magnetic tape, said second difference is less than zero.

10. The printing system according to claim 7, wherein said means for calculating the remaining amount of the slave magnetic tape wound on the supply reel is operative at the time of a second operation by said printing means.

11. A printing system for printing signals representing a program recorded on a master magnetic tape onto a slave magnetic tape having a length substantially longer than the master magnetic tape, comprising:

a supply reel on which the slave magnetic tape is wound;

printing means for applying heat to said master magnetic tape and said slave magnetic tape as both magnetic tapes are closely contacted with each other during the running of the tapes so as to print said signals recorded on the master magnetic tape on the slave magnetic tape being unwound from said supply reel;

means for detecting the rotational speed of a measurement roller which rotates according to a running speed of the master magnetic tape;

means for detecting the rotational speed of said supply reel for the slave magnetic tape;

means for determining a thickness of the slave magnetic tape; and means for calculating the remaining amount of the slave magnetic tape wound on the supply reel on the basis of the detected rotational speeds of said measurement roller and of said supply reel, respectively, and the determined thickness of said slave magnetic tape.

12. A printing system for printing signals representing a program recorded on a master magnetic tape onto a slave magnetic tape having a length substantially longer than the master magnetic tape, comprising:

a supply reel on which the slave magnetic tape is wound;

printing means for applying a magnetic field to said master magnetic tape and said slave magnetic tape as both magnetic tapes are closely contacted with each other during the running of the tapes so as to print said signals recorded on the master magnetic tape on the slave magnetic tape being unwound from said supply reel;

means for detecting the rotational speed of a measurement roller which rotates according to a running speed of the slave magnetic tape;

means for detecting the rotational speed of said supply reel for the slave magnetic tape;

means for determining a thickness of the slave magnetic tape; and means for calculating the remaining amount of the slave magnetic tape wound on the supply reel on the basis of the detected rotational speeds of said measurement roller and of said supply reel, respectively, and said determined thickness of said slave magnetic tape.

* * * * *